(12) United States Patent
Barrett et al.

(10) Patent No.: US 6,796,533 B2
(45) Date of Patent: Sep. 28, 2004

(54) METHOD AND APPARATUS FOR BOUNDARY LAYER REATTACHMENT USING PIEZOELECTRIC SYNTHETIC JET ACTUATORS

(75) Inventors: Ronald M. Barrett, Auburn, AL (US); Christopher Reasonover, Fredericksburg, VA (US); Jeremy Corpening, West Lafayette, IN (US)

(73) Assignee: Auburn University, Auburn, AL (US)

( * ) Notice: Subject to any disclaimer, the term of this patent is extended or adjusted under 35 U.S.C. 154(b) by 0 days.

(21) Appl. No.: 10/104,914

(22) Filed: Mar. 22, 2002

(65) Prior Publication Data

US 2002/0195526 A1 Dec. 26, 2002

Related U.S. Application Data

(60) Provisional application No. 60/278,790, filed on Mar. 26, 2001.

(51) Int. Cl.⁷ .............................................. B64C 21/06
(52) U.S. Cl. ...................................... 244/208; 244/207
(58) Field of Search ................................ 244/207, 208, 244/209, 204, 130, 109, 201

(56) References Cited

U.S. PATENT DOCUMENTS

| | | | | |
|---|---|---|---|---|
| 1,913,644 A | * | 6/1933 | Stalker | |
| 2,219,234 A | * | 10/1940 | Messerschmitt | |
| 3,055,614 A | * | 9/1962 | Thompson | |
| 4,363,991 A | | 12/1982 | Edelman | |
| 4,664,345 A | * | 5/1987 | Lurz | |
| 4,863,118 A | * | 9/1989 | Stallings et al. | |
| 5,758,823 A | | 6/1998 | Glezer et al. | |
| 5,957,413 A | | 9/1999 | Glezer et al. | |
| 5,988,522 A | | 11/1999 | Glezer et al. | |
| 6,412,732 B1 | * | 7/2002 | Amitay et al. | |
| 6,425,553 B1 | * | 7/2002 | Smith et al. | |

FOREIGN PATENT DOCUMENTS

| | | | | |
|---|---|---|---|---|
| DE | 586496 | * | 7/1929 | .................. 244/208 |
| EP | 558904 | * | 9/1993 | .................. 244/204 |
| IT | 302531 | * | 10/1932 | .................. 244/204 |

OTHER PUBLICATIONS

Barrett, R., Gross, R.S., and Brozoski, F.T., "Design and Testing of a Subsonic All–Moving Smart Flight Control Surface", AIAA Journal, vol. 35, No. 7, pp. 1217–1219 (Jul. 1997).

Barrett, R. Stutts, J., "Modeling, Design and Testing of a Barrel–Launched Adaptive Munition," paper presented at SPIE's 1997 Symposium on Smart Structures and Materials, San Diego, CA, Mar. 3–6, 1997.

Cooper, P., "U.S. Eyes Stealthy, Flexible Airframes," Defense News, May 29, 1995, pp. 1,36 vol. 10, No. 21.

Proctor, P., "New Munition Could Replace Some Missiles," Aviation Week and Space Technology, McGraw–Hill, New York, NY, vol. 146, No. 27, Jun. 30, 1997, p. 49.

* cited by examiner

*Primary Examiner*—Tien Dinh
(74) *Attorney, Agent, or Firm*—Gardner Groff, P.C.

(57) ABSTRACT

A method and apparatus for active boundary layer control on an aerodynamic surface. One or more piezoelectric synthetic jet actuators operate as a boundary layer pump to ingest fluid along the surface of an aerodynamic object and discharge fluid tangentially to the fluid flow along the surface and/or at the trailing edge of the object to reduce drag and delay stall.

17 Claims, 4 Drawing Sheets

METHOD AND APPARATUS FOR BOUNDARY LAYER REATTACHMENT USING PIEZOELECTRIC SYNTHETIC JET ACTUATORS

CROSS-REFERENCE TO RELATED APPLICATION

This application claims the benefit of U.S. Provisional Patent Application Ser. No. 60/278,790, filed Mar. 26, 2001, the entirety of which is hereby incorporated herein by reference for all purposes.

BACKGROUND OF THE INVENTION

1. Field of the Invention

The present invention relates generally to the field of aerodynamics, and more particularly to methods and systems for improving aerodynamic performance through active boundary layer control.

2. Description of Related Art

Considerable research has been conducted in the field of aerodynamics toward reducing drag and delaying stall. Delaying stall allows an airplane to fly more slowly at a given angle of attack or to fly at a higher angle of attack for a given speed. A lower stall speed increases the factor of safety for any takeoff or landing, and also allows for shorter takeoffs and landings. Shorter takeoff and landing requirements may allow smaller airports to accommodate larger aircraft, thereby decreasing the traffic around large international airports and increasing passenger convenience and safety. Modern aircraft commonly utilize complex flap arrangements to delay stall. These flap arrangements, however, typically are heavy and expensive to produce and maintain. Accordingly, it would be advantageous to eliminate the need for flap arrangements or decrease their size and complexity.

Reduction of drag reduces the thrust requirements on an aircraft's engines, and increases fuel economy. In addition, decreased drag increases the maximum cruising speed of an aircraft. Trip times may thereby be reduced without increasing fuel consumption. As a result, a smaller, faster fleet can handle the same amount of traffic as a larger, slower fleet. Additionally, a more efficient airplane reduces operation and maintenance costs, further improving a carrier's profitability.

Active boundary layer control is a relatively new area of research in the field of aerodynamics. The relative velocity of the fluid flowing over an aerodynamic surface increases across the boundary layer, from zero at the surface to the maximum velocity at the edge of the boundary layer. Drag is decreased by minimizing the boundary layer and reducing separation of the boundary layer from the surface.

Piezoelectrics have recently emerged as a promising alternative to conventional methods of aerospace device actuation. Piezoelectrics have proven their versatility in many aspects of aerospace engineering, including control and the minimization of weight. In addition, piezoelectric panels have been used to increase or decrease drag by moving the panel towards or away from the ambient fluid. Piezoelectric synthetic jet actuators (Pjets), also called massless jets, typically include a plenum or cavity with a jet orifice and a diaphragm that is vibrationally driven by a piezoelectric actuator. As the diaphragm vibrates, ambient fluid is typically drawn into the plenum through the jet orifice on each downstroke of the diaphragm, and is discharged from the plenum through the jet orifice on each upstroke of the diaphragm. Experiments have been conducted wherein Pjets are embedded within an object to direct airflow normal to the flow of ambient fluid along the surface of the object. These Pjets ingest and expel air through the same slots, causing a recirculation region to form around the actuator that in turn changes the aerodynamic shape of the object. To date, however, these experiments have not focused on the reduction of drag and postponement of stall on an airfoil, and the direction of discharge tangentially to the flow over an airfoil. Accordingly, significant advantage remains to be discovered and optimized in the field of active boundary layer control.

Thus, it has been found that needs exist for improved systems and methods for reduction of drag and postponement of stall on an aerodynamic object through active boundary layer control. It is to these and other needs that the present invention is primarily directed.

SUMMARY OF THE INVENTION

Briefly described, in its preferred embodiments, the present invention relates generally to systems and methods for improved reattachment of the boundary layer to an airfoil surface as the angle of attack is increased, delaying stall, and reducing drag. One aspect of the invention provides a trailing edge-mounted apparatus to prevent air from creeping around the trailing edge from the underside of a wing. Another aspect of the invention uses piezoelectric synthetic jet actuators (PJets) to ingest air into the wing and then expel that air tangentially to the surface of the wing. This prevents any major disturbances in the boundary layer reattachment and flow downstream of the Pjets, and in a sense the arrangement acts as a boundary layer pump, blowing the boundary layer downstream before it can detach. In this manner, drag may be reduced and the wing may reach higher angles of attack before stall.

In one embodiment, the present invention is an aerodynamic object including at least one surface having a leading edge and a trailing edge, and defining a length between the leading edge and the trailing edge. The object also includes at least one chamber within the object, and at least one piezoelectric synthetic jet actuator for drawing fluid into the chamber through an intake and discharging fluid from the chamber through an outlet.

In another embodiment, the present invention is an aerodynamic object including a boundary layer pump for ingesting air at a first location and expelling air at a second location remote from the first location.

Another embodiment of the present invention is a method of improving performance of an aerodynamic object, the method including ingesting air at a first location on the object and expelling air at a second location remote from the first location.

In another embodiment, the present invention is an airfoil including a leading edge and a trailing edge, and defining a length between the leading edge and the trailing edge. The airfoil preferably also includes at least one internal chamber and at least one piezoelectric synthetic jet actuator for drawing fluid into the internal chamber through a first intake and discharging fluid from the internal chamber through a first outlet. The first outlet is preferably located between the first inlet and the leading edge, and the fluid is discharged from the first outlet in a direction generally parallel to an adjacent external surface of the airfoil.

These and other features and advantages of preferred forms of the present invention are described herein with reference to the drawing figures.

DETAILED DESCRIPTION

Referring now to the drawing figures, in which like reference numbers refer to like parts throughout, preferred forms of the present invention will now be described by way of example embodiments. It is to be understood that the embodiments described and depicted herein are only selected examples of the many and various forms that the present invention may take, and that these examples are not intended to be exhaustive or limiting of the claimed invention. Also, as used in the specification including the appended claims, the singular forms "a," "an," and "the" include the plural unless the context clearly dictates otherwise. Ranges may be expressed herein as from "about" or "approximately" one particular value and/or to "about" or "approximately" another particular value. When such a range is expressed, another embodiment includes from the one particular value and/or to the other particular value. Similarly, when values are expressed as approximations, by use of the antecedent "about," it will be understood that the particular value forms another embodiment.

Figure 1:
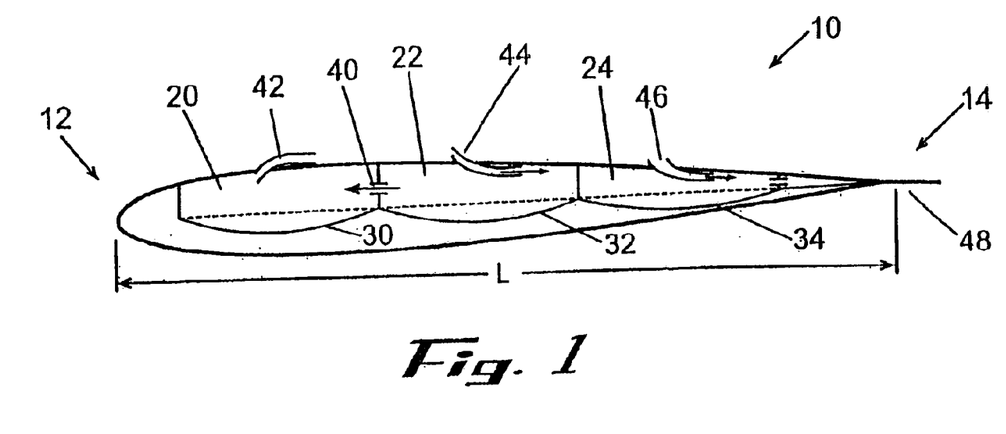
FIG. 1 shows a first cross-sectional view of an aerodynamic object according to one embodiment of the present invention.
Figure 2:
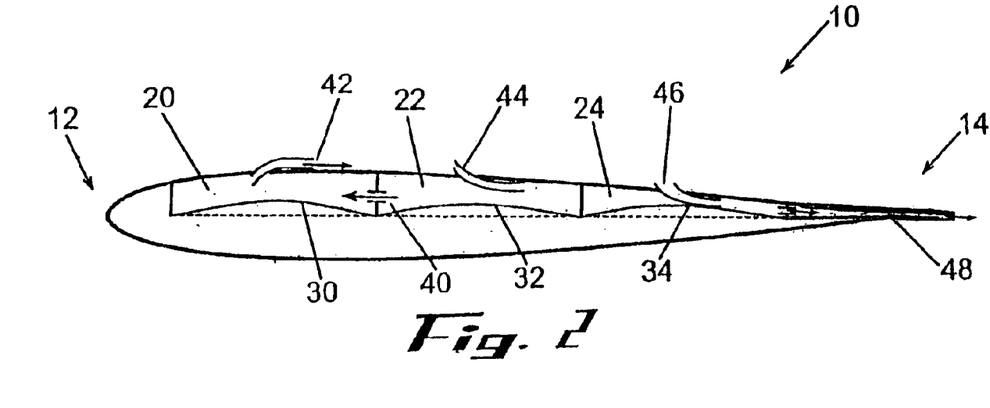
FIG. 2 shows a second cross-sectional view of the aerodynamic object of FIG. 1.

With particular reference now to FIGS. 1 and 2, an embodiment of the present invention includes an aerodynamic object, in this case an airfoil 10. The aerodynamic object may take various forms, including a wing, strut, fuselage or other section of an airplane, a glider, or other form of aircraft. The airfoil 10 comprises a leading edge 12 and a trailing edge 14, and defines a length L between the leading and trailing edges.

Figure 1A:
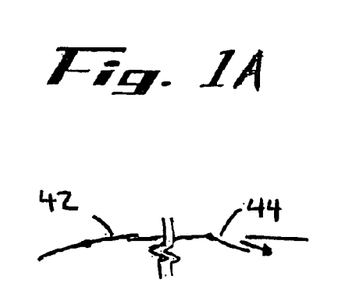
FIG. 1A is a detail view of a portion of the aerodynamic object of FIG. 1.
Figure 2A:
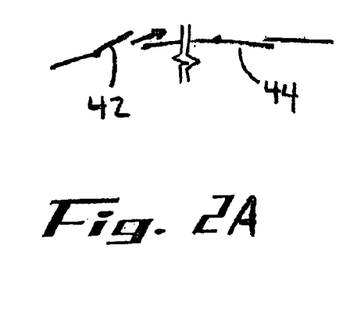
FIG. 2A is a detail view of a portion of the aerodynamic object of FIG. 2.

Preferred embodiments of the airfoil 10 include one or more internal chambers. In the depicted embodiment, three internal chambers, 20, 22, and 24 are shown. Each internal chamber preferably includes one or more piezoelectric synthetic jet actuators ("Pjets") for drawing fluid into the chamber through an intake and for discharging fluid from the chamber through an outlet. In the depicted embodiment, each internal chamber 20, 22, 24 comprises one Pjet 30, 32, 34, respectively. The intake and the outlet for an internal chamber can comprise a single opening or set of openings; or alternatively the intake is a separate opening or set of openings from the outlet, and is remotely located a distance from the outlet. In an example embodiment, the intake and/or the outlet comprise(s) one or more slots extending along the length of the airfoil 10, generally parallel to its leading edge. The intake and/or outlet openings preferably comprise a one-directional flap (e.g. see FIGS. 1A and 2A), a check valve arrangement, a selectively operable closure, or other means for permitting fluid flow in a single direction only and substantially preventing backflow.

In the depicted embodiment, for instance, the forward chamber 20 receives air through one or more intake openings 40 and discharges air through one of more outlets 42 through the upper surface of the airfoil 10, under the influence of Pjet 30. In preferred form, the outlets 42 discharge air in a direction generally tangent or parallel to the upper surface of the airfoil, as indicted by the directional arrow in FIG. 2. The middle chamber 22 receives air through one or more intake openings 44 through the upper surface of the airfoil 10 and discharges air through one of more outlets 40, under the influence of Pjet 32. The rear chamber 24 receives air through one or more intake openings 46 through the upper surface of the airfoil 10 and discharges air through one of more outlets 48, under the influence of Pjet 34. The one or more outlets 48 preferably discharge fluid from the trailing edge 14 of the airfoil 10. Two or more chambers may operate in tandem, as in the case of forward chamber 20 and middle chamber 22, wherein the inlet to one chamber comprises the outlet of the other chamber. Alternatively, a single chamber can operate independently of the other chambers, as in the case of the rear chamber 24.

In preferred embodiments, the intake and outlet openings are located in positions selected to function as a boundary layer pump, and thereby delay stall and decrease drag by reducing or eliminating boundary layer separation from the surface of the aerodynamic object. For example, in the depicted embodiment, the forward chamber 20 and middle chamber 22 operate in tandem as a first boundary layer pump, wherein Pjets 30 and 32 drive the ingestion of air through the intake 44 and the discharge of air from the outlet 42. The outlet 42 is preferably located between the intake 44 and the leading edge 12, whereby reduced pressure in the area of the intake 44 and the tangential discharge from the outlet 42 serve to minimize boundary layer separation from the airfoil surface. The inlet 44 is preferably located about midway between the leading edge 12 and the trailing edge 14, where boundary layer separation may originate. The outlet 42 is preferably located about 30% of the length L rearward of the leading edge 12. The rear chamber 24 operates as a second boundary layer pump, wherein Pjet 34 drives the ingestion of air through the intake 46 and the discharge of air from the outlet 48. The intake 46 is preferably located about 75% of the length L rearward of the leading edge 12, at another point where boundary layer separation may originate. Reduced pressure due to the fluid ingestion in the vicinity of the intake 46 minimizes boundary layer separation in this area. The outlet 48 is preferably located at the trailing edge, to direct the creeping flow of pockets of air circulating from the lower surface of the airfoil to the upper surface downstream, thereby delaying stall.

The Pjets 30, 32, 34 are vibrationally driven to sequentially increase and decrease the volume of the chambers 20, 22, 24, thereby drawing surrounding fluid into the chambers and expelling fluid from the chambers. The flaps or other means for controlling the fluid flow direction operate to prevent outflow through the intakes 44, 46 and to prevent inflow through the outlets 42, 48. The Pjets 30, 32, 34 are preferably driven at a resonant frequency to maximize the volume of fluid transfer.

EXAMPLE

A wing section incorporating certain aspects of the present invention was fabricated and studied. The following outlines the design, manufacturing, and testing of piezoelectric synthetic jet actuators (PJets) in an associated wing section used to reattach the boundary layer. In order to achieve boundary layer reattachment the PJets were mounted inside a 6 inch wide by 12 inch long NACA 0012 airfoil. The air flowing over the upper surface of the airfoil was ingested through inlet slots located at 50% and 75% chord and then expelled tangential to the surface through outlet slots located at 30% chord. The outlet slot was covered with a fiberglass flap to direct the flow. By running the PJets at 100 Volts AC peak-to-peak, a resonance frequency was reached at 420 Hz, which allowed the PJets to ingest the maximum amount of air possible. When the wing was tested in the wind tunnel at various angles of attack it was observed, through the use of titanium tetrachloride flow visualization, that the recirculation bubble attempted to form but was blown away due to a jet velocity of 7.2 ft/s coming from the outlet slot. At an angle of attack of 15° this caused the boundary layer to move closer to the surface of the wing by about 0.7 inches. If this technology were incorporated into current aircraft, resulting advantages could include greater take-off weight capacity, shorter runways, and/or increased fuel efficiency.

The aft PJet 34 was used to suck air from the upper wing surface, assisting in the reattachment of the boundary layer. Then, that ingested air was expelled through steel flaps extending from the trailing edge 14 of the airfoil. By expelling air from the trailing edge the creeping flow from the lower to upper surface of the airfoil is blown downstream. This reduces drag on the airfoil and prevents pockets of circulating air from creeping towards the leading edge 12 causing stall. This "boundary layer pump" reduces drag and prevents stall at higher angles of attack.

Airfoil Fabrication:

The airfoil was constructed with two layers of Cyanimide 123 prepregnated graphite cloth and cured in the form of a NACA 0012 airfoil. The cure procedure was conducted at 350° F. (177° C.) for approximately three hours. Next, the edges of the airfoil section were constructed with four layers of Cyanimide 123 prepregnated graphite. These pieces of graphite were clamped between two aluminum caul plates to assure a smooth surface. After the cure stage the airfoil section and the sides were cut and sanded into the proper dimensions. The final product was a NACA 0012 that was six inches wide by twelve inches long. After sanding the airfoil to the proper dimensions, the surface was made as smooth as possible so that the flow would not be disturbed by any irregularities. To do this, the surface was covered in glazing putty and then carefully sanded with 600 grit sandpaper. This process was repeated five times so that a smooth, glass-like surface was obtained. Then the entire airfoil was covered with sandable primer and sanded with 600 grit sandpaper to smooth out the surface even more. The next step was to attach the sides. To make for easy installation of the sides and piezoelectric diaphragms the airfoil was cut at the leading edge. The sides were mounted perpendicularly to one half of the airfoil surface and adhered with Hysol™ epoxy. The final product was two sections of a NACA 0012 airfoil, both extremely smooth and one with sides attached.

Slot and Flap Fabrication

The next phase was the cutting of the ingesting and expelling slots along with the necessary flaps to maintain tangential flow. The positioning of each slot was determined by the placement of the piezoelectric synthetic jet actuators (PJets). Of the three PJets, the two trailing ones (PJets 32 and 34) were used to ingest air while the one closest to the leading edge (PJet 30) was used to expel the air. The slots 44, 46 over the two ingesting actuators were cut in the center to achieve the maximum amount of air suction possible. Each slot was approximately three inches long and was cut generally perpendicular to the flow of air. The two ingesting slots were cut 5.8 inches and 9.2 inches from the leading edge 12. The one expelling slot 42 was cut 3.7 inches from the leading edge 12 which was near the back of the first actuator 30. This position was chosen so that the expelled air would not disrupt the suction of the boundary layer and would also create some circulation between PJets 30 and 32. To cut the slots perpendicular to the airflow a dremel/lathe setup was used. This setup assured that each slot was straight, approximately three inches long, and perpendicular to the airflow. Next, an effective flap was designed that would allow for the expelled airflow to enter the boundary layer over the wing surface tangentially. Also, the flaps needed to seal the ingesting slots when the air was expelled and then seal the expelling slot when the air was ingested. To do this, composite fiberglass was used along with Hysol™ epoxy and Teflease™ tape. First, a small piece of Teflease™ tape was placed over the slot so that the Hysol™ epoxy would not seal the slot permanently. Next, a three-mil thick piece of fiberglass was stuck to the Teflease™ tape and then soaked in Hysol™ epoxy. The epoxy was then cured in the oven at 120° F. for 45 minutes. The finished products were three thin fiberglass flaps which opened downstream of the flow. The two flaps for the ingesting PJets were mounted on the interior of the wing while the one flap for the expelling PJet was mounted on the outer surface of the wing. To maintain a smooth flow the flap mounted on the outer surface was very carefully sanded using 600 grit sandpaper.

Piezoelectric Synthetic Jet Actuator Fabrication

Three fiberglass plenums were molded, each three inches by three inches square. This was done by cutting a block of wood just under three inches by three inches and then wrapping strips of fiberglass around the block. The plenums were made to be about 0.1 to 0.2 inches thick. Then the block and fiberglass were vacuum bagged under 20 psi and cured at 250° F. for three hours. This assured that each plenum was completely cured and would be compressed to the proper dimensions. Next, one side of each plenum was sanded square while the other was sanded to lie flush against the interior surface of the airfoil. The next step was the fabrication of the 7.5 mil thick PZT-5H piezoelectric sheet. The following list contains a step-by-step procedure for the lay-up of an entire PZT-5H piezoelectric sheet:

1. Cut 0.0015 inch AISI 1010 steel shimstock to a 3.5 inch by 3.5 inch square. This is called the substrate.
2. Clean the surface of the substrate using Isopropanol and 400 grit sandpaper.
3. Soak the substrate in an Isopropanol bath.
4. Cover one side of a piezoelectric sheet with Teflease™ tape. Make sure the edges of the tape DO NOT overlap (called a butt joint) and use a burnishing tool to bond the tape to the sheet.
5. Use Acetone to remove the wax from the exposed surface of the piezoelectric sheet.
6. Use Phosphoric Acid to etch the substrate surface that will be bonded to the piezoelectric sheet.
7. Drench the substrate in Isopropanol to neutralize the Phosphoric Acid.
8. Put a thin layer of Hysol™ epoxy on the exposed surface of the piezoelectric sheet.

9. Put a thin layer of Hysol™ epoxy on the etched surface of the substrate.
10. Using Masterbond EP-21TD C-N conducting epoxies put a cross on the substrate surface covered in Hysol™ epoxy from step 9. Make sure that the cross is as smooth as possible to prevent the piezoelectric sheet from cracking.
11. Place the piezoelectric sheet on the substrate with the taped surface facing up.
12. Using light pressure (wearing gloves), carefully work Hysol™ fillets around all the edges of the piezoelectric sheet. Apply very little pressure and always knead using thumbs from the center of the sheet towards the outer edges.
13. Use Teflease™ tape to attach the piezoelectric sheet and substrate combination to an aluminum caul plate also covered with Teflease™ tape. Again, make sure only butt joints are used and burnish the tape to the surface. The Teflease™ tape is advantageous because the Hysol™ epoxy will not adhere to it.
14. Now wrap the aluminum caul plate in breather cloth and seal it into a vacuum bag with only one hose allowing air to exit the bag.
15. Place the bag into a pre-heated oven (250° F.) and pressurize to 1 psi.
16. After two minutes, slowly pressurize the bag to 2 psi. Wait another two minutes and pressurize to 3 psi and continue this procedure until 5 psi is reached.
17. Hold the pressure at 5 psi for at least 30 minutes at 250° F.
18. Let the bag cool down and then remove the aluminum caul plate and pull the Teflease™ tape tangentially from the surface of the piezoelectric sheet and substrate combination.

The end result will be a 3.5 by 3.5 inch square of steel shimstock electrically and mechanically bonded to a 2.9 by 2.9 inch piezoceramic sheet. After three successful piezoelectric sheets were created they were tested by soldering one wire to the steel substrate and adhering the other wire to the piezoelectric sheet using Masterbond EP-21TD C-N conducting epoxies. Then, each piezoelectric sheet was mounted to the square sides of the fiberglass plenums using black silicone. Finally, the exposed steel was coated with Rustoleum™ to prevent corrosion during use. The aft PJet (Pjet 34) was used to ingest air and then expel that air out the trailing edge 14. To do this, small holes were drilled in the trailing edge of plenum 24 and then 0.0015 inch AISI 1010 steel flaps were attached with Hysol™ epoxy. The edges of these steel flaps were then sealed with flashing tape so that the air would be expelled through the trailing edge of the airfoil and would seal when air was ingested from the upper slot. The plenums were then attached to the interior of the wing surface using a hot glue gun so that an airtight seal was created and, if necessary, a PJet could be removed with ease.

Piezoelectric Synthetic Jet Actuator Testing

To make sure that each of the three piezoelectric synthetic jet actuators (PJets) were performing properly, four different tests were done before the final wind tunnel testing was conducted. The four tests administered were quasi-static at 0.5 Hz, quasi-static laser deflection at 0.5 Hz, dynamic, and wing mounted dynamic testing. All four tests were performed on each of the three PJets, but due to space limitations only the data from the forward most PJet (PJet 30) will be displayed. The data from PJets 32 and 34 were very similar to that found from PJet 30, so it was not necessary to include all the data.

Quasi-Static Testing at 0.5 Hz

Figure 5:
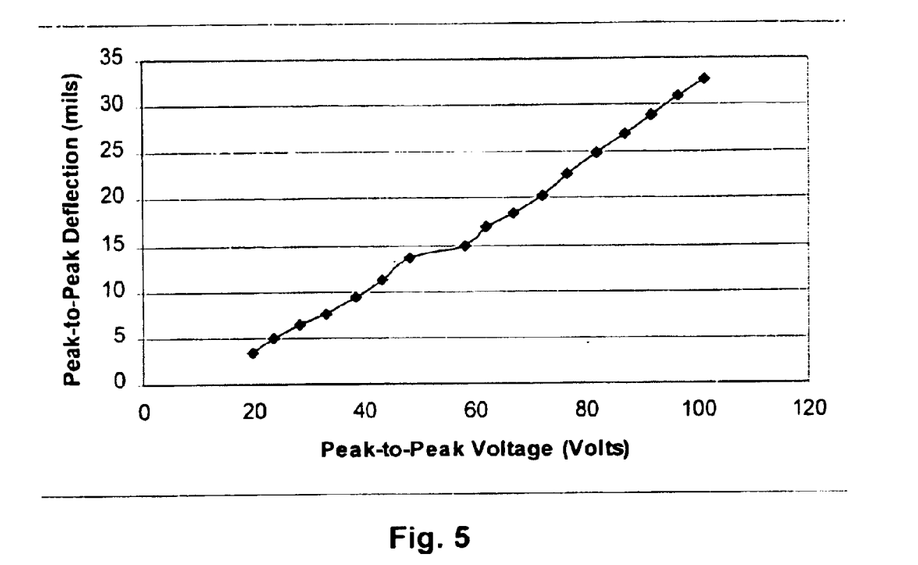
FIG. 5 is a graph of Pjet deflection vs. voltage according to an embodiment of the invention.

For this test PJet 30 was clamped to a table and the center deflection (or curvature) of the piezoelectric sheet and substrate combination was recorded at different voltage levels. The frequency level was quasi-static at 0.5 Hz so that the deflection was slow and could be easily measured with a dial gage placed in the center of the piezoelectric sheet. The graph of FIG. 5 shows the peak-to-peak center deflection of P Jet #1 as a function of the peak-to-peak voltage input for quasi-static testing.

As can be seen, the maximum deflection occurred at 100 Volts AC peak-to-peak and was 32.8 mils peak-to-peak. To protect the piezoelectric elements the voltage input was limited to 100 Volts AC. The deflection of 32.8 mils allowed an estimate of the volume of air that could be moved through the box as 0.026 $in^3$ per deflection. Similarly, the maximum deflections at 100 Volts AC peak-to-peak for PJets 32 and 34 were 25.0 mils and 28.4 mils peak-to-peak, respectively. This led to air volume movements of 0.016 $in^3$ per deflection for PJet 32 and 0.017 $in^3$ per deflection for PJet 34.

Quasi-Static Laser Deflection Testing at 0.5 Hz

Figure 6:
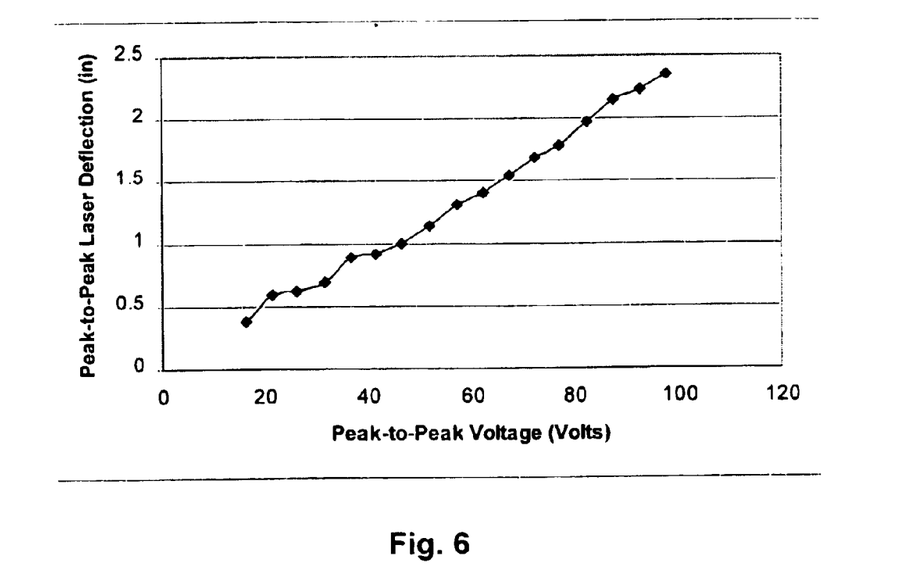
FIG. 6 is a graph of laser deflection vs. voltage according to an embodiment of the invention.

The next test was the quasi-static laser deflection and this test consisted of mounting a small mirror on the surface of the piezoelectric sheet, aiming a He-Ne laser at the mirror, and measuring the deflection of the laser dot on a graph board 93.75 inches from the mirror. The mirror was positioned on the piezoelectric sheet directly in the middle of the line connecting the center of the sheet with the bisector point on one of the sides. This position gave the maximum amount of laser deflection so that more accurate measurements could be made. FIG. 6 is a graph showing the measurements made for PJet 30 at various voltage levels. As before, the frequency was quasi-static at 0.5 Hz so the laser would move slowly and the deflection could be measured. By conducting this test the results from the Quasi-Static Testing at 0.5 Hz were found to be accurate due to the similarity in deflections.

Again, the graphs for PJets 32 and 34 were very similar to that for Pjet 30.

Dynamic Testing

Figure 7:
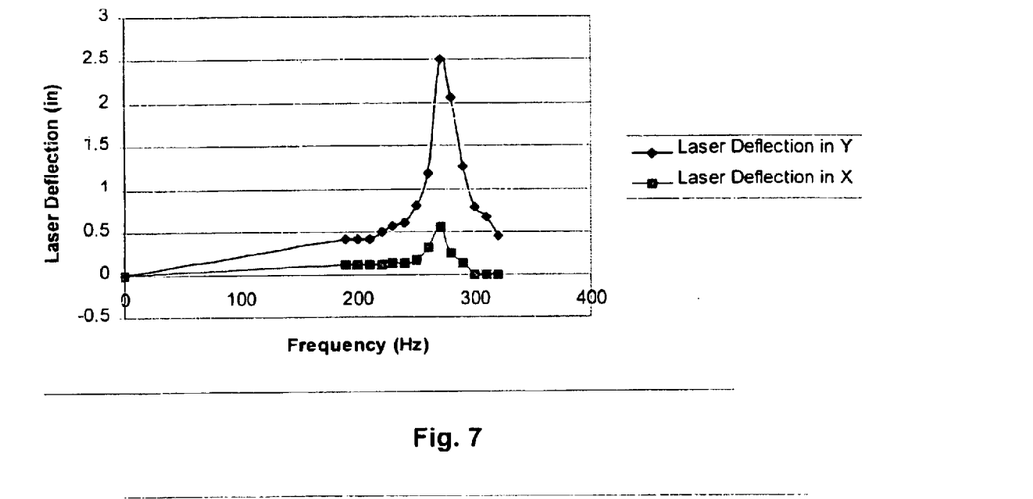
FIG. 7 is a graph of laser deflection vs. frequency according to an embodiment of the invention.

The dynamic testing procedure consisted of hard mounting PJet 30 in a vice grip, setting a specific voltage, and changing the frequency until resonance was reached. The voltage was set at 10 Volts AC peak-to-peak, however, the piezoelectric elements used can withstand up to 100 Volts AC peak-to-peak. The laser and mirror from the quasi-static laser deflection test were also used to see maximum deflections in the X and Y directions (in plane with PJet 30) along with the shapes that were formed at the various frequencies. FIG. 7 is a graph of the data found from the dynamic testing.

As can be seen, PJet 30 reached a maximum deflection at 275 Hz.

Wing Mounted Dynamic Testing

Figure 8:
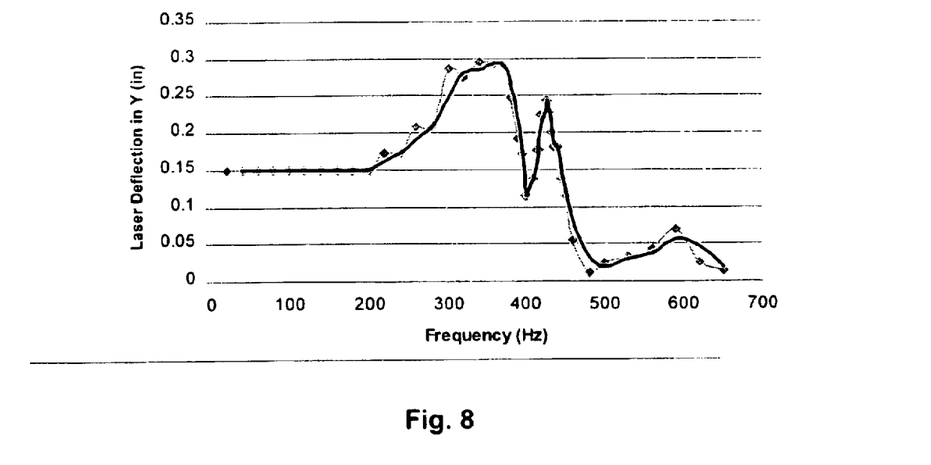
FIG. 8 is a graph of laser deflection vs. frequency according to another embodiment of the invention.

It was discovered that the PJets performed differently when actually mounted in the interior of the wing. The resonance frequency of 275 Hz no longer applied so the dynamic testing was repeated at 10 Volts AC peak-to-peak and a new resonance frequency was found. FIG. 8 is another graph with the data found from the wing mounted dynamic testing.

As the graph shows, resonance frequency now occurred at 428 Hz and the deflections were similar to those found during the first dynamic testing. This is because once PJet 30 was mounted in the wing it was held much more rigidly, changing the way it performed. The second peak at 428 Hz was found to give the proper mode for maximum air intake. Again, PJets 32 and 34 showed similar characteristics and proved to be working well.

Wind Tunnel Testing

Figure 3:
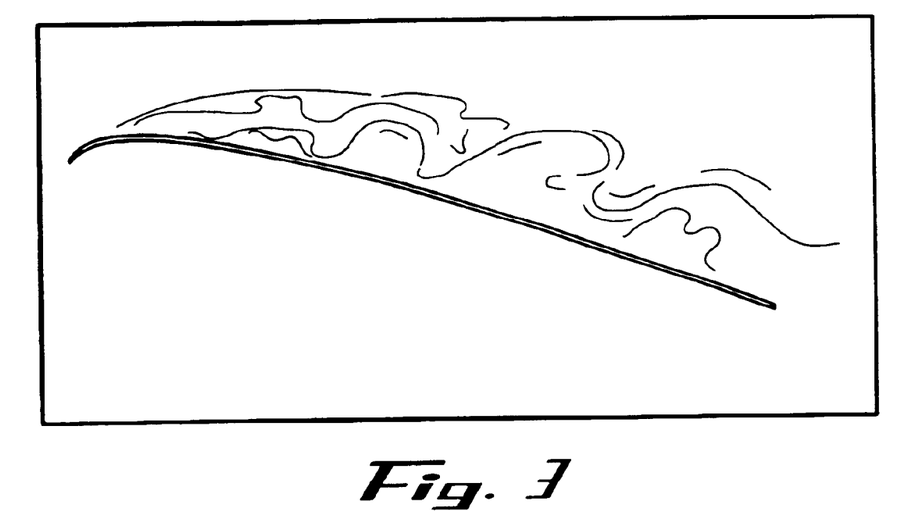
FIG. 3 shows a wind tunnel test flow pattern of an aerodynamic object without active boundary layer control according to the present invention.
Figure 4:
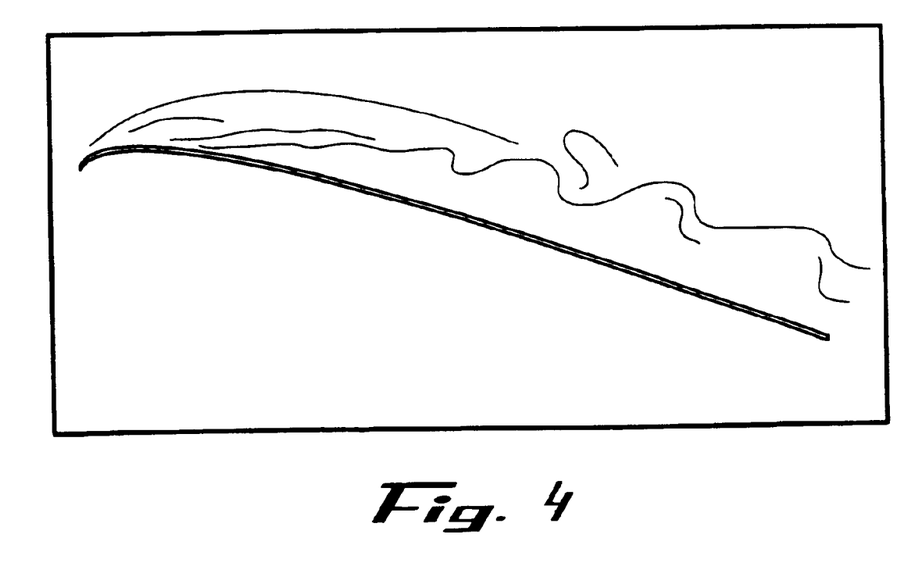
FIG. 4 shows a wind tunnel test flow pattern of an aerodynamic object with active boundary layer control according to the present invention.

The next phase of testing was conducted in the wind tunnel. The wind tunnel contained an 11.5 in by 11.5 in test section and had a maximum air speed of 20 ft/s. This test was conducted at an airspeed of 10 ft/s so that better pictures of the flow could be taken. It was found that Titanium Tetrachloride (TiCl$_4$) provided suitable smoke density for flow visualization. FIGS. 3 and 4 show the wind tunnel setup and wind tunnel testing at a 15° angle of attack along with how the flow was affected due to the PJets. In FIG. 3, two recirculation bubbles can be seen forming around 25% chord without the piezoelectric synthetic jet actuators running. Eventually these bubbles burst causing flow separation and stall. When the PJets were running (FIG. 4) the air speed exiting PJet 30 was found, by using a hot wire anemometer, to be 7.2 ft's. This jet of air caused the recirculation bubbles to be blown downstream and pulled the boundary layer closer to the airfoil surface by 0.7 inches.

Conclusions

Boundary layer reattachment over an airfoil at increasing angles of attack was achieved through the use of piezoelectric synthetic jet actuators (PJets) mounted inside the airfoil ingesting and expelling air. Three different PJets were constructed, tested, and then mounted on the interior of the airfoil. The maximum amount of air ingestion was obtained at 100 Volts AC peak-to-peak and 428 Hz. The volume of air moved per second was calculated by multiplying the volume per stroke for each piezoelectric synthetic jet actuator by 428 Hz. The volume of air moved per second for each actuator can be seen in the table below:

| Piezoelectric Synthetic Jet Actuator Volume Calculations | | | |
|---|---|---|---|
| | Volume per Stroke (in^3) | Actuation Frequency (Hz) | Volume per Second (in^3/s) |
| PJet 30 | 0.026 | 428 | 11.128 |
| PJet 32 | 0.016 | 428 | 6.848 |
| PJet 34 | 0.017 | 428 | 7.276 |

By ingesting air and then expelling it generally tangentially to the upper surface, the recirculation bubbles that would otherwise generate boundary layer separation and stall were blown downstream of the flow. Using a hot wire anemometer, the air speed exiting PJet 30 was found to be 7.2 ft/s. By blowing the recirculation bubbles away and sucking air into the airfoil from the upper surface, the boundary layer stayed attached at higher angles of attack. At an angle of attack of 15° the boundary layer was pulled closer to the upper surface of the airfoil by 0.7 inches. This effect would allow for an airfoil to achieve higher angles of attack while also reducing drag due to boundary layer separation.

The scope of this example can be extended to other sizes and shapes of aerodynamic objects with variations or modifications that will be readily apparent to those of ordinary skill in the art in view of the present disclosure. One variation could simply be the type of airfoil tested. For this example, a NACA 0012 airfoil was used, but the invention may readily be adapted to other airfoils. The actuators used for this project were 2.9×2.9 inches, but the size and/or number of the piezoelectric actuators could readily be increased or decreased.

While the invention has been described in its preferred forms, it will be readily apparent to those of ordinary skill in the art that many additions, modifications and deletions can be made thereto without departing from the spirit and scope of the invention.

What is claimed is:

1. An aerodynamic object comprising:
   at least one surface having a leading edge and a trailing edge, and defining a length between said leading edge and said trailing edge;
   at least one chamber within said object;
   at least one piezoelectric synthetic jet actuator for drawing fluid into said chamber through an intake and discontinuously discharging the fluid from said chamber through an outlet, wherein said outlet discharges fluid in a direction generally tangent to the at least one surface.

2. The aerodynamic object of claim 1, said outlet is located between the intake and the leading edge.

3. The aerodynamic object of claim 1, wherein said outlet is located at the trailing edge.

4. The aerodynamic object of claim 1, wherein said intake comprises an inwardly pivotal flap and said outlet comprises an outwardly pivotal flap.

5. The aerodynamic object of claim 4, wherein said intake ingests fluid in a direction generally tangent to the at least one surface.

6. A method of improving performance of an aerodynamic object, said method comprising ingesting air into a first chamber at a first location on said object pumping the ingested air from said first chamber to a second chamber for expulsion and discontinuously expelling the air from said second chamber in a direction generally tangent to a surface of said object at a second location remote from said first location wherein the steps of ingesting air into said first chamber, pumping the air from said first chamber to said second chamber, and expelling the air from said second chamber further comprise operating a first piezoelectric synthetic jet actuator in said first chamber and a second piezoelectric synthetic jet actuator in said second chamber in tandem.

7. The method of claim 6, further comprising driving said first piezoelectric synthetic actuator positioned centrally under said first location to ingest air.

8. An aerodynamic object comprising:
   at least one upper surface having a leading edge and a trailing edge;
   a first chamber defined within said object and having an intake between said leading edge and said trailing edge;
   a second chamber defined within said object, having an outlet between said leading edge and said first chamber, and in fluid communication with said first chamber;
   a first actuator operable to draw fluid into said first chamber through said intake, wherein said intake is positioned centrally over said first actuator; and
   a second actuator operable to discharge the fluid from said second chamber through said outlet, wherein said outlet is positioned centrally over said second actuator.

9. The aerodynamic object of claim 8, wherein said first actuator and said second actuator are operable in tandem to ingest the air into said first chamber, pump the air from said first chamber to said second chamber, and expel the air from said second chamber.

10. The aerodynamic object of claim 8, wherein said outlet expels the fluid in a direction generally tangent to the at least one surface.

11. The aerodynamic object of claim 8, wherein said first and second actuators comprise piezoelectric synthetic jets.

12. An aerodynamic object comprising:
   at least one upper surface having a leading edge and a trailing edge;

a first chamber defined within said object and having an intake between said leading edge and said trailing edge;

a second chamber defined within said object, having an outlet between said leading edge and said first chamber, and in fluid communication with said first chamber;

a first actuator operable to draw fluid into said first chamber through said intake;

a second actuator operable to discharge the fluid from said second chamber through said outlet;

a third chamber defined within said object, having an intake between said second chamber and said trailing edge, and having an outlet at said trailing edge; and a third actuator operable to draw fluid into said third chamber through said intake and discharge the fluid from said third chamber through said outlet.

13. The aerodynamic object of claim 12, wherein said second chamber outlet and said third chamber outlet each expel the fluid in a direction generally tangent to the at least one surface.

14. An aerodynamic object comprising:

at least one upper surface having a leading edge and a trailing edge;

a chamber defined within said object, having an intake between said leading edge and said trailing edge, and having an outlet at said trailing edge;

an actuator operable to draw fluid into said chamber through said intake and discharge the fluid from said chamber through said outlet, wherein said intake is positioned centrally over said actuator.

15. The aerodynamic object of claim 14, wherein said outlet expels the fluid in a direction generally tangent to the at least one surface.

16. The aerodynamic object of claim 14, wherein said actuator comprises a piezoelectric synthetic jet.

17. The aerodynamic object of claim 14, wherein said intake comprises an inwardly pivotal flap that intake ingests the fluid in a direction generally tangent to the at least one surface.

* * * * *